United States Patent
Townsend et al.

(10) Patent No.: US 6,308,986 B1
(45) Date of Patent: Oct. 30, 2001

(54) RESTRAINT BELT PRESENTER

(75) Inventors: John A. Townsend, Bloomfield Hills; John E. Campbell, Hazel Park; Mohamed El-Sayed, Bloomfield Hills; Arthur L. Guertin; Michael P. Kaczmar, both of Rockwood; Robert Walker, Jr., Novi, all of MI (US)

(73) Assignee: Joalto Design, Inc., Southfield, MI (US)

( * ) Notice: Subject to any disclaimer, the term of this patent is extended or adjusted under 35 U.S.C. 154(b) by 0 days.

(21) Appl. No.: 09/549,415

(22) Filed: Apr. 14, 2000

Related U.S. Application Data

(60) Provisional application No. 60/129,790, filed on Apr. 16, 1999.

(51) Int. Cl.$^7$ .................................................. B60R 22/03
(52) U.S. Cl. ...................... 280/807; 280/808; 280/804; 297/481
(58) Field of Search ...................... 280/802, 804, 280/807, 808; 297/481, 473, 474

(56) References Cited

U.S. PATENT DOCUMENTS

| | | |
|---|---|---|
| 3,623,768 | 11/1971 | Capener . |
| 3,833,257 | 9/1974 | Dove . |
| 4,179,086 | 12/1979 | Yamada . |
| 4,275,903 | 6/1981 | Matsuoka et al. . |
| 4,317,584 * | 3/1982 | Takata ................................. 280/804 |
| 4,323,267 * | 4/1982 | Takada ................................. 280/807 |
| 4,341,399 * | 7/1982 | Thomas ............................... 280/802 |
| 4,345,780 * | 8/1982 | Moriya et al. ....................... 280/802 |
| 4,431,233 | 2/1984 | Ernst . |
| 4,432,566 | 2/1984 | Andres et al. . |
| 4,451,061 * | 5/1984 | Takada ................................. 280/802 |
| 4,480,713 | 11/1984 | Macht et al. . |
| 4,482,188 * | 11/1984 | Tilly et al. .......................... 297/473 |
| 4,508,362 | 4/1985 | Higuchi . |
| 4,531,762 * | 7/1985 | Sasaki et al. ....................... 280/808 |
| 4,589,680 * | 5/1986 | Gurtler et al. ...................... 280/804 |
| 4,629,214 | 12/1986 | Föhl . |
| 4,635,963 * | 1/1987 | Higuchi et al. .................... 280/801.1 |
| 4,667,982 | 5/1987 | Volk et al. . |
| 4,681,345 | 7/1987 | Swartout . |
| 4,725,076 | 2/1988 | Taylor . |
| 4,783,098 * | 11/1988 | Yokouchi ............................. 280/808 |
| 5,261,696 | 11/1993 | Hamaue . |
| 5,263,741 | 11/1993 | Seros et al. . |
| 5,280,958 * | 1/1994 | Chung ................................... 280/804 |
| 5,346,256 * | 9/1994 | Wiesler et al. ...................... 280/802 |
| 5,431,446 * | 7/1995 | Czarnecki et al. ................... 280/802 |
| 5,934,759 | 8/1999 | Paschek et al. . |

FOREIGN PATENT DOCUMENTS

| | | |
|---|---|---|
| 2 308 343 A | 8/1974 | (DE) . |
| 34 32 669 A1 | 3/1986 | (DE) . |
| 35 37 089 | 4/1987 | (DE) . |
| 38 00 592 | 7/1989 | (DE) . |
| 296 13 427 U1 | 11/1996 | (DE) . |
| 0 172 453 A2 | 7/1985 | (EP) . |
| 2235362-A * | 3/1991 | (GB) . |
| 5802350 | 8/1984 | (JP) . |
| WO 94 01297 | 1/1994 | (WO) . |
| WO 96/40543 | 12/1996 | (WO) . |

* cited by examiner

*Primary Examiner*—Lanna Mai
*Assistant Examiner*—Ruth Ilan
(74) *Attorney, Agent, or Firm*—Rader, Fishman & Grauer PLLC

(57) ABSTRACT

A restraint belt presenter assembly includes a restraint belt positioning member carried by a slidable member that is selectively driven by a track drive mechanism to move a restraint belt buckle assembly forward from its unused, storage position to a presentation position for easy grasping by a vehicle seat occupant. The slidable member is connected to a track that may optionally be pivotally mounted to elevate the restraint belt positioning member into the presentation position. Alternatively, the track member may include an inclined distal end, such that the slidable member moves upwardly into the presentation position. Another embodiment includes a pivoting shaft member that pivots the restraint belt buckle assembly forward for a starting position to the presentation position as the slidable member travel upwardly on an inclined track.

13 Claims, 14 Drawing Sheets

RESTRAINT BELT PRESENTER

RELATED APPLICATIONS

This application claims the benefit of U.S. Provisional Application Ser. No. 60/129,790 filed Apr. 16, 1999 entitled "SEAT BELT PRESENTER", hereby incorporated by reference in its entirety.

FIELD OF THE INVENTION

The present invention relates to a restraint belt presenter for vehicles, and more particularly to a presenter system that presents the restraint belt to a vehicle occupant.

BACKGROUND OF THE INVENTION

The use of restraint belts in vehicles is known for providing vehicle occupants with protection in the event of a collision or accident. Conventional restraint belts include a combination of a lap belt portion and shoulder belt portion formed from a continuous belt. In such an arrangement, one end of the belt is anchored to a structural floor member of the vehicle behind a seat on its outboard side. The other end is secured to a retracting mechanism mounted on or in the 'B' pillar rearward from the vehicle door, the outboard edge of the ceiling or floor, or in the seat back. A buckle for engaging with a receptacle positioned adjacent to the inboard side of the vehicle seat, is slidably attached to the belt. When not in use, the retracting mechanism biases the belt and buckle toward the outboard side of the vehicle.

To secure a restraint belt, the vehicle occupant typically must first twist around in the seat and reach across their body to try and grab the buckle that is located above and behind the seat. Next, the occupant must draw the buckle and belt across his body such that the shoulder belt portion extends from the retracting mechanism diagonally across the occupant's chest while the lap belt portion is directed across the occupant's lap. Finally, the occupant must releasably secure the buckle to the receptacle. Such prior art restraint systems are undesirable. It is awkward for an occupant to twist around and grab a buckle. Thus, statistics have shown that people will often forget or forego using such prior art restraint systems.

To overcome the problems associated with conventional restraints systems, another type of restraint system known as a "passive" restraint system has been developed. One such passive restraint system uses separate lap and shoulder belts. The lap belt is of a conventional design wherein a retracting mechanism is positioned adjacent to the seat on its outboard side. The shoulder belt has one end attached to the inside of the upper rear corner of the vehicle door. The other end is engaged with a separate retracting mechanism adjacent to the inboard side of the seat. When the vehicle door is opened, the belt extends from the inboard side of the seat away from the seat to the outer corner of the vehicle door, so as to enable the vehicle occupant to enter the vehicle between the shoulder belt and the seat. Once the door is pulled shut, the inboard end of the shoulder belt retracts, thereby securing the shoulder belt around the vehicle occupant. The lap belt is then separately secured across the occupant's lap. While restraint systems of this type reduce the problems associated with the awkward manual fastening of the restraint belt, the positioning of shoulder belt reduces the available room in which the vehicle occupant may enter and exit the vehicle, thus hindering entry and exit of the vehicle.

To provide more room to enter and exit the vehicle, another known type of passive restraint system has the outboard end of the shoulder belt attached to a movable shuttle riding in a track along the upper periphery of the door opening. When the door is opened, the shuttle automatically moves the outboard end of the shoulder belt forward along the track. More room is provided for the occupant to enter and exit the vehicle without becoming inadvertently entangled in the shoulder belt. The lap belt still must be separately and manually fastened across the occupant's lap in the conventional manner.

To simplify restraint systems, another known type of restraint system includes a pivotable armrest positioned on the outboard side of a vehicle seat that has a combination shoulder and lap restraint belt secured in a detent mechanism at the lower forward inboard end of the armrest when the armrest. An end of the lap belt is anchored to the floor of the vehicle while an end of the shoulder belt is retractably attached to a belt reel and tensioner. When the armrest is in a lowered position, the detent serves to position the belt buckle in plain view and adjacent the vehicle occupant to permit easier grasping of the belt buckle for fastening. A guide incorporated with the armrest further assures the proper positioning of the buckle. When the belt is unbuckled and the armrest raised, the buckle is automatically returned to the detent by belt reel and tensioner to maintain the proper positioning of the buckle for the next use. However, the addition of the guide and the detent to the armrest still provide additional manufacturing steps, thereby increasing costs.

Therefore, there exists a need for a restraint presentation system that insures reliable capturing and positioning of the belt for repeated use.

SUMMARY OF THE INVENTION

The present invention is directed to a restraint belt presenter assembly for bringing a restraint belt forward from its storage position and presenting it to a vehicle occupant. The invention includes a slidable member positioned adjacent to and alongside a vehicle seat, the slidable member carrying a restraint belt positioning member, and a drive mechanism for moving the slidable member. The slidable member moves between a starting position, where the restraint belt buckle assembly is stored so as not to impede ingress and egress from the vehicle and a presenting position that conveniently positions the restraint belt buckle assembly within clear view and easy reach of a vehicle seat occupant. The drive mechanism includes a generally linear track member and a drive chain assembly that is connected to and supported by the track member and driven by a motor. The motor may be a conventional gear motor having a predetermined gear ratio, an electric motor or other suitable motor. The slidable member is mounted to the track member and is operatively connected to the drive chain assembly such that a drive chain moves the slidable member along the track member between the starting and presentation positions.

In one preferred embodiment, the track member is mounted for pivotal movement such that a distal end of the track member raises the restraint belt positioning member to a predetermined height when as the slidable member reaches the presentation position. The track member may be fixedly mounted to a mounting bracket that is pivotally connected to a vehicle structural component. Alternatively, the track member may be pivotally mounted to the mounting bracket.

To pivot the distal end upwardly into the presentation position, the restraint belt presenter assembly is further provided with a cam member and cam follower. The cam member is operatively connected the drive chain assembly and track member for rotational movement. The cam follower is fixedly secured to a vehicle component adjacent to the track member so as to be engaged with a contoured surface of the cam member. As the cam member rotates, cam follower follows along the contoured surface, pivoting the track mechanism upwardly as the cam member rotates in a first direction. The cam member preferably further includes first and second stop members that restricts the movement of the slidable during the presentation cycle.

In another preferred embodiment, to eliminate the cam member and cam follower components, but still providing for elevation of the buckle assembly once the slidable member reaches the presentation position, the track member is provided with an upwardly extending curved section. Accordingly, one distal end of the track member is positioned at a predetermined height that is higher than the other distal end of the track member. Thus, when slidable member reaches the elevated distal end of the track member and the presentation position, the restraint belt positioning member that is carrying the restraint belt buckle assembly is elevated to a predetermined height that is clearly viewable and within easy reach of a vehicle seat occupant.

Another embodiment of the invention that includes an upwardly rising restraint belt positioning member, is also disclosed. Instead of a slidable member engaging the track member, the track member cooperates a roller and a guide track. The guide track is positioned adjacent to the track member and is spaced a predetermined distance therefrom. The roller includes a vertically slidable extension member that has a guide protrusion extending therefrom. The guide protrusion frictionally engages the guide track and moves along the guide track as the roller travels along the track member. A distal end of the guide track is curved upwardly such that as the guide protrusion follows the guide track, the extension member slides upwardly to lift a restraint belt positioning member to the presentation position.

Another embodiment that is disclosed includes a slidable member that is movable along a track member and has a shaft member pivotally connected thereto that carries a restraint belt and a drive mechanism for moving the moving the slidable member between a starting position and a presentation position. The track member is positioned at an angle such that a distal end positioned away from the starting position of the slidable member is higher than the other distal end. A drive chain assembly having a motor driven sprocket, at least one idler pulley and a drive chain that is mounted on the track member with the drive chain being operatively connected to the slidable member.

The shaft member includes a first end that is fixedly connected to a pivoting member on a vehicle component, such as a vehicle seat. A second end includes a positioning ring that retains the restraint belt thereto. During operation, as the slidable member moves from the starting position to the presentation position by means of the drive assembly, the shaft member pivots upwardly from a starting position to a presentation position that is generally vertical to position a restraint belt buckle assembly within easy reach of a vehicle occupant.

The embodiments of the restraint belt presentation assembly may be mounted to either the base of the vehicle seat, either within the seat cushion, on a side surface of the seat cushion or vehicle seat back, underneath the seat cushion or on the vehicle body adjacent the vehicle seat (e.g., the floor). Further, non-rising embodiments may be incorporated in an interior door panel or on a center console between the vehicle seats with a slot being provided to permit the restraint belt positioned member to extend through. All of the embodiments of the restraint belt presentation assembly are preferably fully automated by a central processing unit that dictates the sequence of the presentation cycle so as to automatically present the restraint belt buckle assembly to a vehicle seat occupant and automatically return the restraint belt positioning member to the starting position, out of the way of the vehicle occupant after the belt buckle assembly is engaged with a mating buckle receptacle.

Another embodiment of the restraint belt presentation assembly includes a motor driven shoulder portion of the vehicle seat that is positioned so as to be in a co-linear relationship with the restraint belt. The shoulder portion pivots downwardly with respect to the vehicle seat back, contacting a portion of the restraint belt to present the restraint belt to a vehicle seat occupant.

Accordingly, the restraint belt presenter assembly of the present invention provides a reliable, efficient device for retaining a restraint belt buckle assembly, and moving the buckle assembly to a presentation position, allowing a user to easily see and grasp the buckle and remove it from the presenter, and returning the presenter to a starting position out of the way of the vehicle occupant.

BRIEF DESCRIPTION OF THE DRAWINGS

The features and inventive aspects of the present invention will become more apparent upon reading the following detailed description, claims, and drawings, of which the following is a brief description:

DETAILED DESCRIPTION OF PREFERRED EMBODIMENTS

Figure 2:
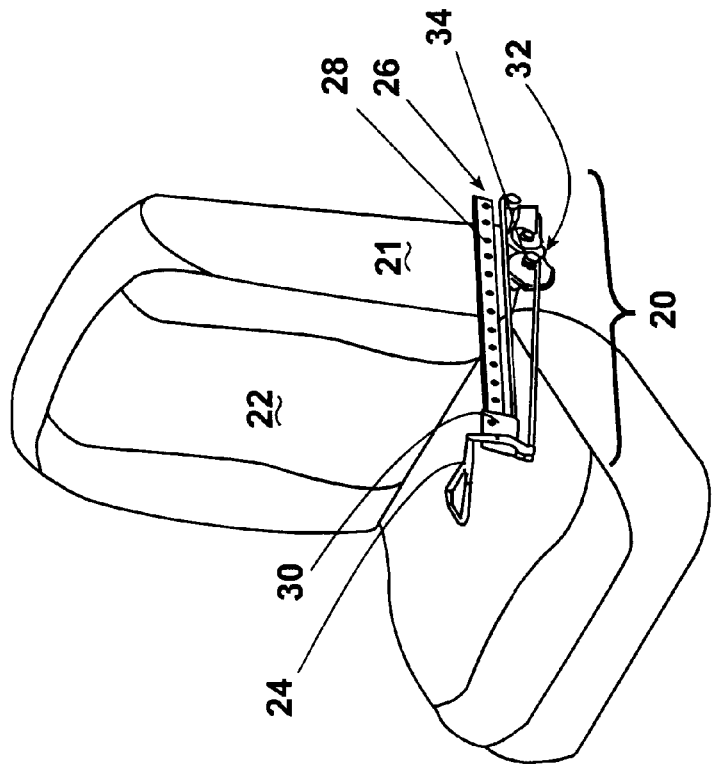
FIG. 2 is a perspective view of the sliding restraint belt presenter in a presenting position.
Figure 1:
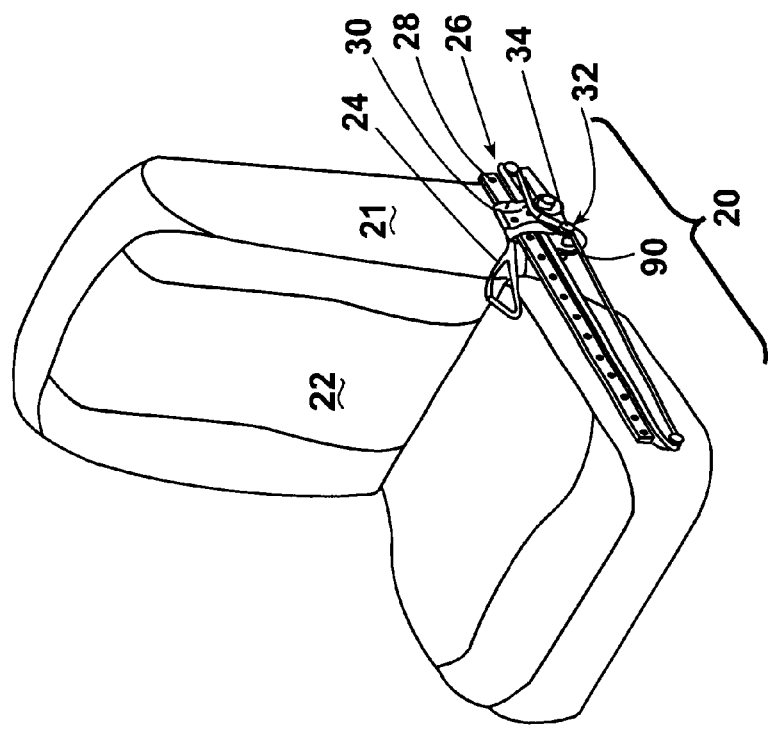
FIG. 1 is a perspective view of a sliding restraint belt presenter according to the present invention attached to a vehicle seat and positioned in a retracted position.

FIGS. 1–7 show a first embodiment of a restraint belt presenter assembly 20 pivotally mounted on a vehicle seat 22 according to the present invention. Restraint belt presenter assembly 20 includes a restraint belt positioning member 24 that is movably mounted to a track drive mechanism 26. In accordance with the invention, track drive mechanism 26 selectively moves restraint belt engaging member 24 through a restraint belt presentation cycle from a starting position (as best seen in FIG. 1) to a presentation position (as best seen in FIG. 2). An optional housing (not shown) may be provided to serve as a cover for assembly 20. Track drive mechanism 26 includes a track member 28, a slidable member 30 for supporting restraint belt positioning member 24, a drive chain sub-assembly 32, and a gear mechanism 34 that cooperates with a cam member 36 and a cam follower 38 during operation of restraint belt presenter assembly 20 to move between the starting position and presentation position.

Track member 28 is a generally rectangular component having first and second distal ends 40 and 42 and a plurality of track mounting apertures 44 positioned therebetween. Track member 28 serves as the support for the components of restraint belt assembly 20.

In the first preferred embodiment, track member 24 is operatively connected to the rear proximity 21 of vehicle seat 22 by a mounting bracket 46. Mounting bracket 46 includes an upper mounting plate 48, a central base member 50 and a lower mounting plate 52. Upper mounting plate 48 further includes a plurality of bracket mounting apertures 54 that align with a portion of track mounting apertures 44 at first distal end 40 of track member 28, a pivotal connection member 56 and a gear train mounting aperture 58. In one preferred embodiment, pivotal connection member 56 includes a pin that extends outwardly and away from upper mounting plate 48 to be received in an aperture formed on a structural frame member of vehicle seat 22 such that mounting bracket 46 is pivotal about axis A—A. Alternatively, the structural frame member of vehicle seat may include a mounting shaft that is received in an aperture 56a formed through upper mounting plate 48. Gear train mounting aperture 58 is positioned on a downwardly angled leg 64 and is adapted for rotationally mounting drive chain sub-assembly 32.

Central base member 50 has a forward edge 66 and a rearward edge 68. Forward edge 66 is connected to a bottom portion 70 of upper mounting plate 48. Rearward edge 68 is connected to an upper portion 72 of lower mounting plate 52.

Lower mounting plate 52 further includes a central support plate 74 and a cam mounting bracket 76. Central support plate 74 includes a plurality of mounting apertures 78 that are adapted to carry a motor 80 and motor carrying plate 82, a portion of gear mechanism 34 and a portion of drive chain sub-assembly 32, to be explained in further detail below. Cam mounting bracket 76 extends laterally from central support plate 74 and includes a cam mounting aperture 84 adapted to carry cam member 36, a portion of gear mechanism 34 and a portion of drive chain subassembly 32.

Motor 80 is preferably a gear motor. However, other suitable motors may be employed. Motor 80 is secured to motor carrying plate 82. Motor carrying plate 82 is fixedly connected to lower mounting plate 52 by motor mounting apertures 86 that align with mounting apertures 78 of lower mounting plate 52 and are secured together by conventional fastening devices. A first transfer gear 88 is mounted to motor mounting plate 86 and is operatively connected to motor 80 such that power is transmitted from motor 80 to first transfer gear 88 to rotate first transfer gear 88 about axis B—B. First transfer gear 88 cooperates with a second transfer gear 90, to be explained below in further detail.

Figure 5:
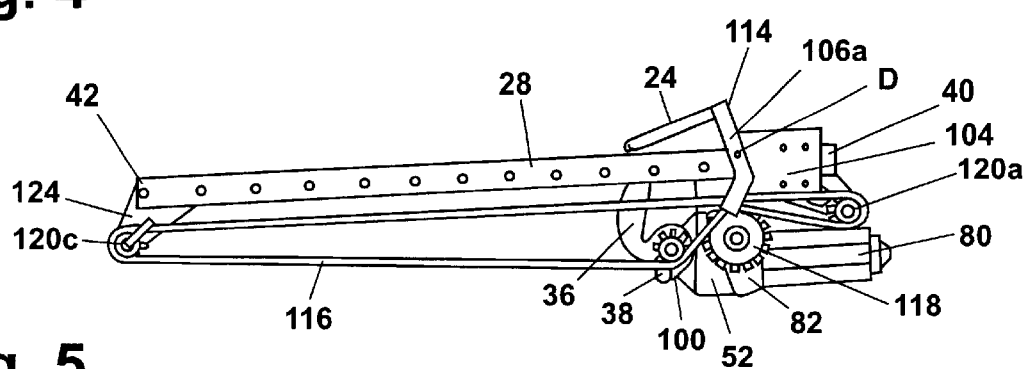
FIG. 5 is an elevational view of the sliding restraint belt presenter at the starting position with the gear assembly removed for illustrative purposes.
Figure 6:
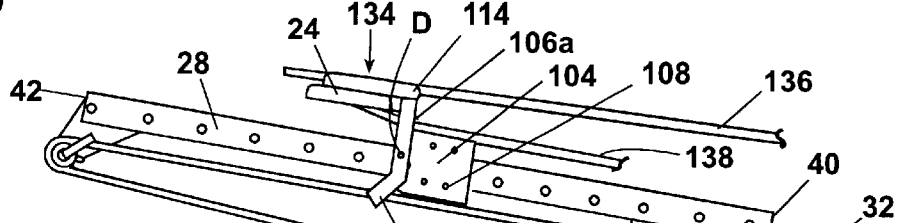
FIGS. 6–7 are elevational views of the sliding restraint belt presenter as it travels from the starting position to the presenting position.
Figure 7:
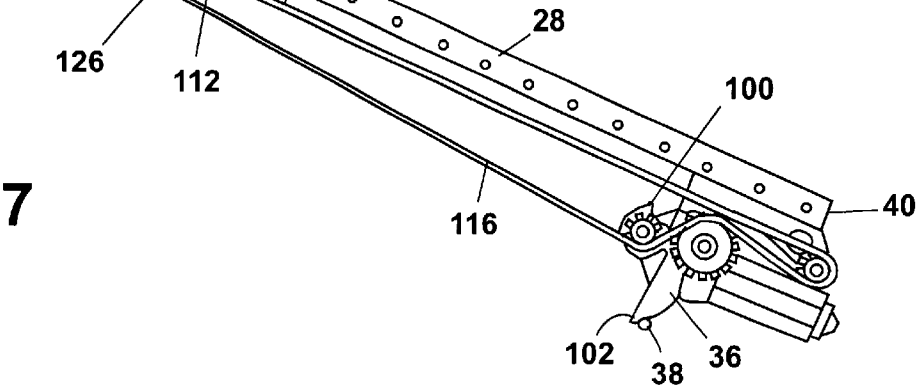

Cam member 36 includes an upper circular portion 92 and a lower semicircular portion 94. Upper circular portion 92 includes a cam mounting aperture 96 that aligns with cam mounting aperture 84 of cam mounting bracket 76 and cam member 36 is mounted to cam mounting bracket 76 for rotational movement about axis C—C. Lower semi-circular portion 94 has an outer contoured surface 98 that terminates in first and second mechanical stops 100 and 102, respectively. As best seen in FIGS. 5–7, contoured surface 98 engages cam follower 38 to move restraint belt assembly 20 between the starting position and the presentation position, as will be explained in further detail below. Preferably, cam follower 38 is a pin that is fixedly secured to vehicle seat 22, and positioned so as to be below track drive mechanism 26. Rotatably connected to cam member 36 is second transfer gear 90, such that second transfer gear 90 rotates about axis C—C.

Figure 3:
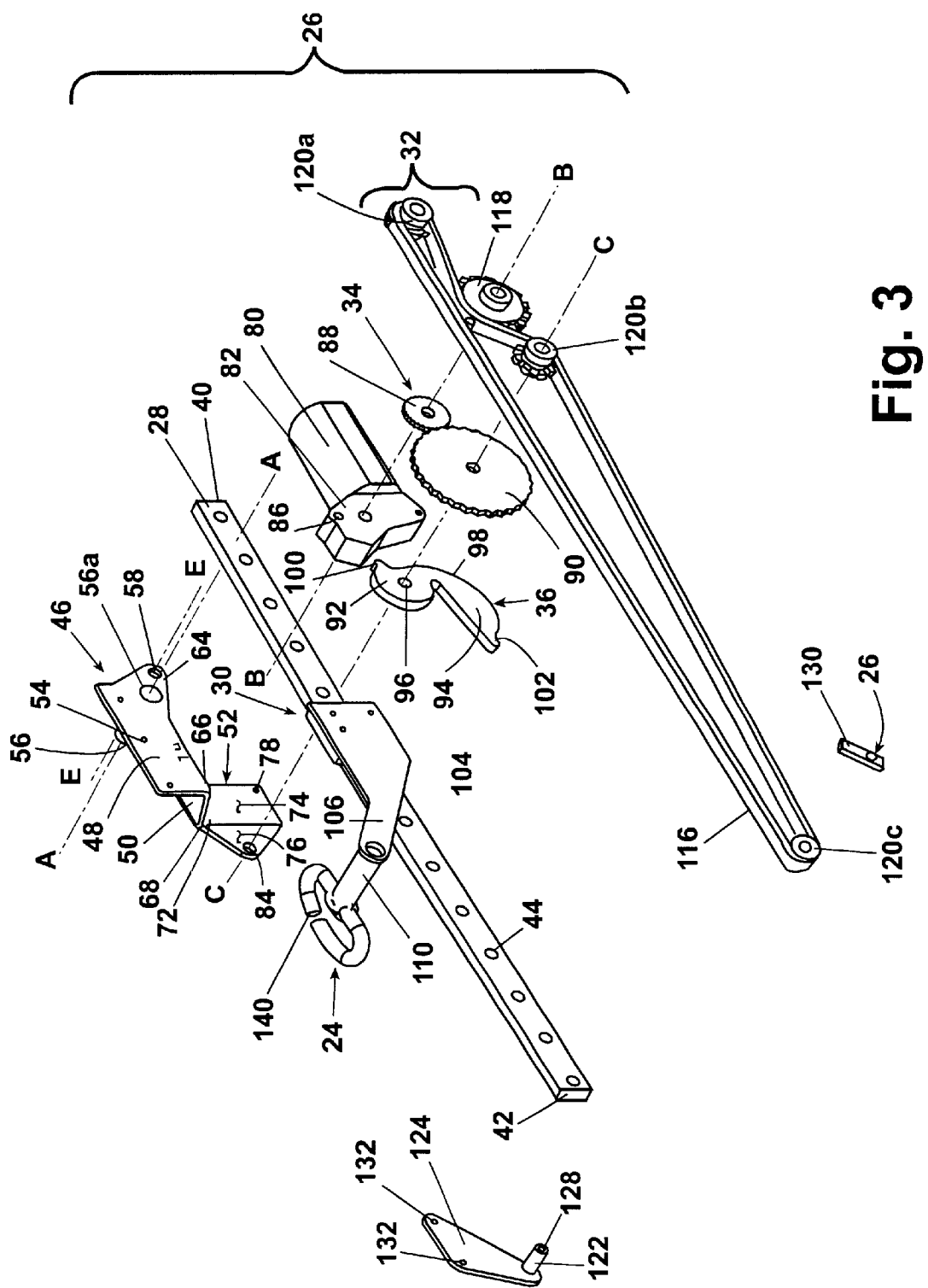
FIG. 3 is an exploded view of the sliding restraint belt presenter.
Figure 4:
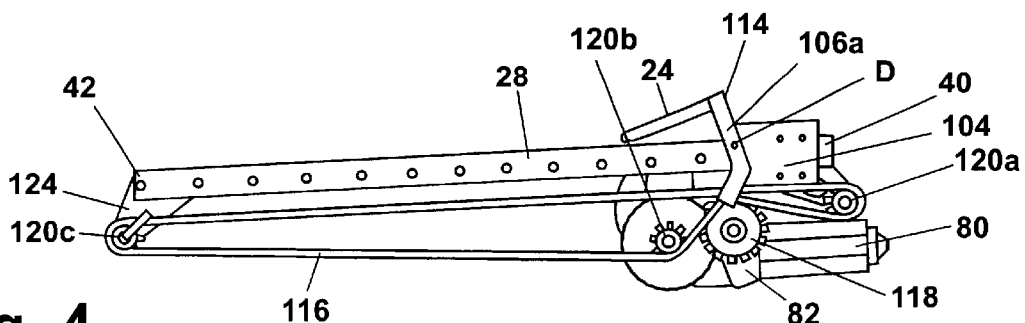
FIG. 4 is an elevational views of the sliding restraint belt presenter at the starting position.

Slidable member 30 includes an engaging base section 104 that is slidably mounted on track member 28 and an extension member 106. A lower portion 108 of engaging base section 104 is operatively connected to drive chain sub-assembly 32. In one embodiment, as seen in FIG. 3, extension member 106 is angled upwardly from engaging base section 104 and connected to a positioning arm 110 that carries restraint belt positioning member 24. Restraint belt positioning member 24 is in the form of a ring such that the center portion of ring is open, to be explained in further detail below. In another embodiment, as shown in FIGS. 4–7, extension member 106a is pivotally connected to slidable member 30 for limited pivotal movement about point D. Extension member 106a further includes an offset leg portion 112 that extends below slidable member 30. Restraint belt positioning member 24 is fixedly secured to a top portion 114 of extension member 106a.

Drive chain sub-assembly 32 includes a drive belt 116 which is driven by a tooth drive gear pulley 118 and engages a series of idler pulleys 120 located adjacent drive gear pulley 118 and at first and second distal ends 40 and 42 of track member 28. Idler pulley 120a is rotatably mounted to gear train mounting aperture 58 on mounting bracket 46 such that idler pulley 120a rotates about axis E—E. Idler pulley 120b is rotatably mounted to second transfer gear 90 such that idler pulley 120b is rotatable about axis B—B.

Idler pulley 120c is rotatably mounted on a shaft 122 that extends outwardly from a drive train support plate 124. Once idler pulley 120c is mounted on shaft 122, a securing member 126 is connected to a distal end 128 of shaft 122. In one preferred embodiment, as shown in FIGS. 4–7, securing member 126 preferably further includes an upwardly angled arm 130 that cooperates with leg portion 112 of extension member 106a to serve as a stop mechanism for slidable member 30, to be explained in further detail below. Drive train support plate 124 further includes drive plate mounting apertures 132 that align with a portion of track mounting apertures 44 to secure drive train support plate to second distal end 42 of track member 28. Conventional fasteners secure drive train support plate 124 to track member 28 Drive gear pulley 118 is connected to electric motor 80 via gear mechanism 34.

With reference to FIGS. 1–2 and 4–7, the operation of restraint belt presenter assembly 20 is as follows. Restraint belt presenter assembly 20 is initially at the generally horizontal starting position with slidable member 30 positioned at first distal end 40 of track member 28 and cam follower 38 engaging first mechanical stop member 100. A belt buckle assembly 134 is positioned on top of restraint belt positioning member 24 such that a buckle extends outwardly and away from slidable member 30. A shoulder portion 136 of the restraint belt is positioned above restraint belt positioning member 24 and a lap belt portion 138 is positioned so as to extend down through the central section of restraint belt positioning member 24. Both shoulder portion 136 and lap belt portion 138 have distal ends connected to one or more conventional take-up reels (not shown). When restraint belt presenter assembly 20 is at the starting position restraint belt positioning member 24 is positioned at a predetermined height that does not alter the path of the restraint belt and is low enough to avoid bodily contact in the event of a side impact collision.

A central processing unit controls the sequence of the presentation cycle. An electrical door switch or sensor in the vehicle door cooperates with a "seat occupied" switch or sensor in vehicle seat 22 to trigger the presentation cycle of restraint belt presenter 20. When the door switch indicates that the vehicle door is closed and the "seat occupied" switch indicates that vehicle seat 22 is occupied motor 80 is activated, transmitting power to drive chain sub-assembly 32 via first and second transfer gears 88 and 90. As drive belt 116 begins to move, slidable member 30 begins traveling towards second distal end 42 of track member 28 and cam member 36 begins to rotate counter-clock-wise, with cam follower 38 engaging outer contoured surface 98. Because cam follower 38 is fixedly connected to vehicle seat 22, mounting bracket 46 with restraint belt presenter assembly 20 attached thereto begins to pivot about axis A—A such that second distal end 42 of track member 28 moves upwardly. Slidable member 30 continues to second distal end 42, until cam follower 38 engages second mechanical stop 102. Once cam follower 38 engages second mechanical stop 102, slidable member 30 is in the presenting position with restraint belt positioning member 24 being at a predetermined height that is clearly visible and easily accessible to the vehicle occupant. Next, vehicle occupant may simply lift off buckle assembly 134 from restraint belt positioning member 24 and secure buckle assembly 136 to a buckle receptacle (not shown) located adjacent to vehicle seat 22 on a side opposite of restraint belt presenting assembly 20.

Preferably, an electrical limit switch or positional sensor connected to the central processing unit shuts off motor 80 when restraint belt presenter 20 reaches the presenting position. Further, as buckle assembly 134 is removed from restraint belt positioning member 24, the electrical sensor causes motor 80 to return slidable member 30 to the starting position, conveniently out of the vehicle occupant's way. Once reaching the starting position, motor 80 is shut off by an electrical limit switch or positional sensor. When the vehicle occupant disengages buckle assembly 136 from the buckle receptacle, at least one pre-tensioned take-up reel automatically returns buckle assembly 136 to restraint belt positioning member 24.

In the embodiment shown in FIG. 4–7, securing member 126 with angled arm 130, contacts leg portion 112 of extension member 106a when slidable member 30 reaches second distal end 42. This contact rotates extension member 106 slightly forward to permit easy accessibility to buckle assembly 136 to a vehicle occupant.

In the event of a power failure of the central processing unit, restraint belt positioning member 24 preferably further includes a slit 140 (as shown in FIG. 3) extending through the periphery of restraint belt engaging member 24. Slit allows lap belt portion 138 of restraint belt to be selectively disengaged from restraint belt positioning member 24. Restraint belt positioning member 24 is shaped and sized to allow travel and rotation of lap belt portion 138, while prohibiting buckle assembly 134 from passing through. Restraint belt positioning member 24 may have any suitable shape such as a D-shape, as shown in FIG. 3 or a triangular shape as shown in FIGS. 1–2.

Figure 8:
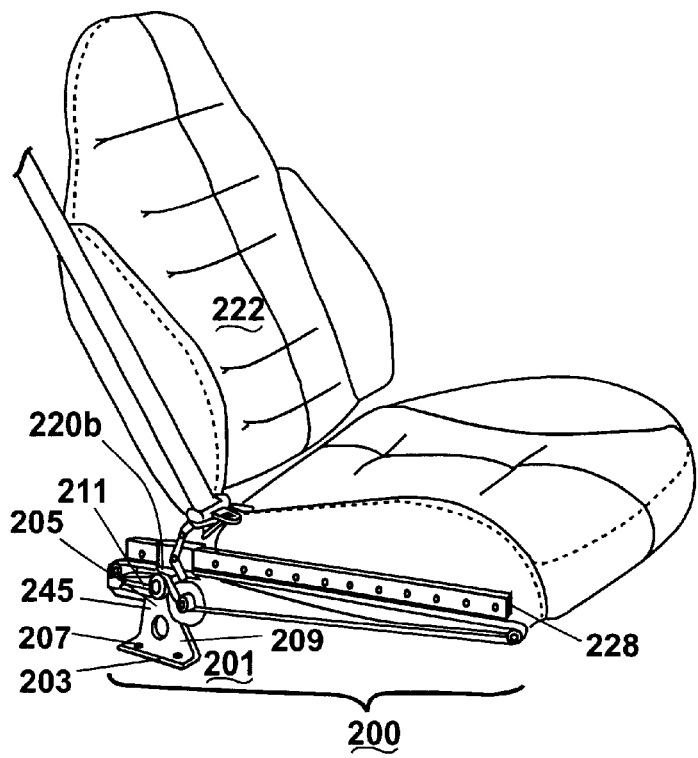
FIGS. 8 and 9 are perspective views of an alternative floor mounted sliding restraint belt presenter.
Figure 9:
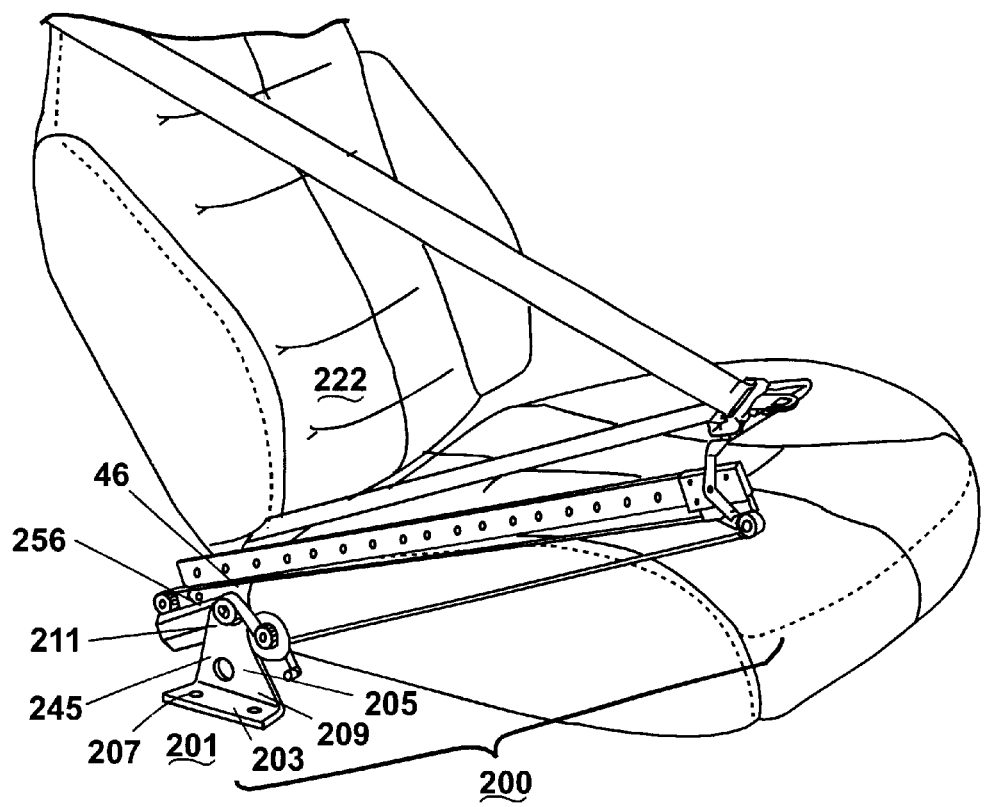

FIGS. 8 and 9 are directed to an alternative embodiment of restraint belt presenter assembly 200. Assembly 200 is substantially identical to assembly 20, except that assembly 200 further includes a second mounting bracket 245 mounted to the floor 201 of the vehicle, adjacent vehicle seat 222. Mounting bracket 245 includes a base portion 203 and a central section 205. Base portion 203 is positioned perpendicular to central section 205. While base portion 203 is shown to extend outwardly from central section 205 on one side of central section 205, it is understood that base portion 203 can extend outwardly from either side of central section 205 or both.

Base portion 203 includes at least one mounting bracket aperture 207 for receiving a suitable fastener to fixedly connect mounting bracket 245 to floor 201. Central section 205 is triangular shape such that a lower portion 209 is wider than an apex 211 of central section 205.

Assembly 200 further includes a track mounting bracket 246 similar to mounting bracket 46 of assembly 20 except mounting bracket 246 is not connected to vehicle seat 222. Mounting bracket 246 includes an outwardly extending pivotal connection member 256. Pivotal connection member 256 mounts to apex 211 of mounting bracket 246 by extending through a pivotal connection aperture that extends through apex 211 of mounting bracket 245. Once received in connection aperture 256, idler pulley 220b is pivotally mounted on an outboard side of central section 205. Floor mounted assembly 200 advantageously permits aftermarket installation of assembly 200.

Figure 10:
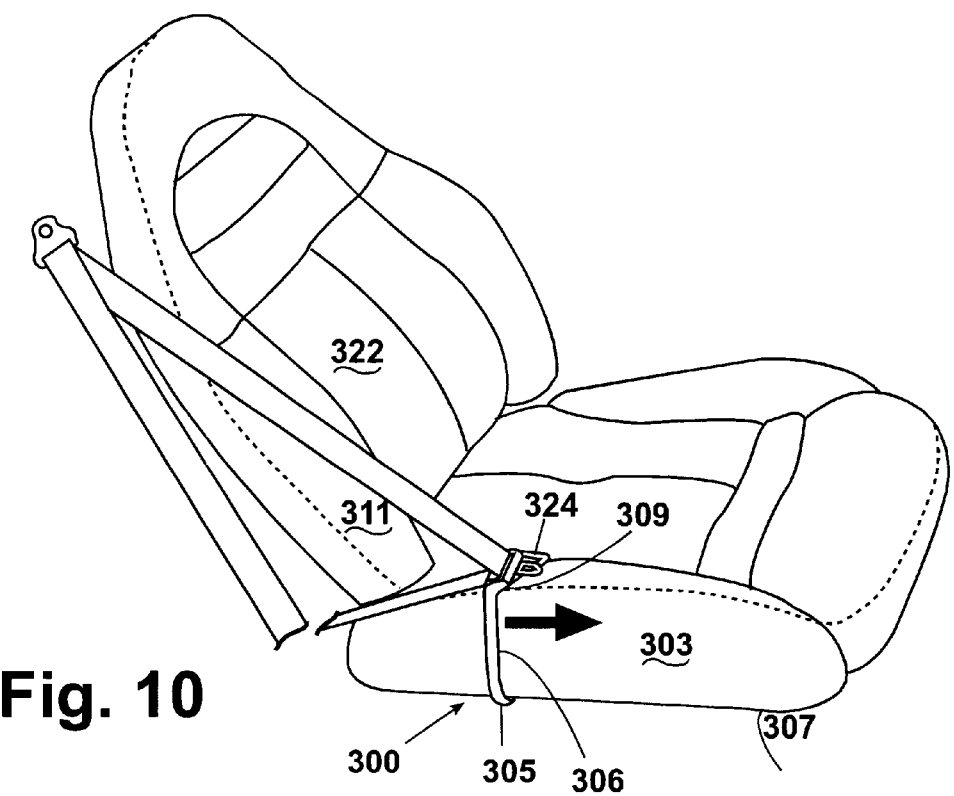
FIGS. 10 and 11 are perspective views of an alternative, non-rising sliding restraint belt presenter.
Figure 11:
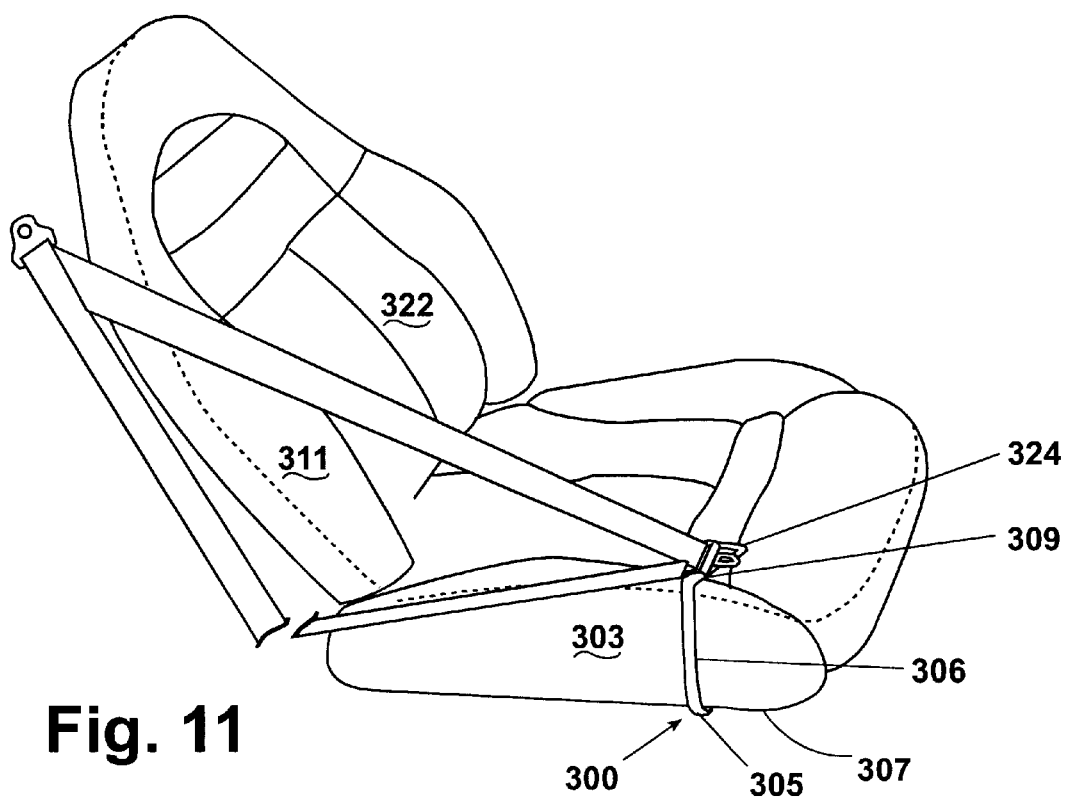

Referring to FIGS. 10 and 11, an alternative, non-rising restraint belt presenter assembly 300 is disclosed. An optional housing (not shown) may be provided to serve as a cover for assembly 300. Unlike assemblies 20 and 200, the second distal end of the track member of assembly 300 does not pivot upwardly. Further, assembly 300 is fixedly secured under vehicle seat 322. Instead, the cam member 36 and 236 of assemblies 20 and 200 are eliminated and extension member 306 of the slidable member (hidden within base 303 of vehicle seat 322) is an extended bracket that has a lower base portion 305 that encircles an outer periphery 307 and an upper base portion 309 that carries restraint belt positioning member 324.

In the starting position (FIG. 10), extension member 306 is positioned adjacent to vehicle seat back 311. When the electric motor activates assembly 300, extension member 306 moves forward to the presenting position (FIG. 11) such that restraint belt positioning member 324 is generally parallel to a vehicle occupant's knee. Because the second distal end of the track member does not pivot upwardly, assembly 300 may be stowed in an unobtrusive position underneath vehicle seat 322. Further, electric motor may be separately mounted from the remainder of assembly 300 to advantageously relax packaging constraints.

Figure 12:
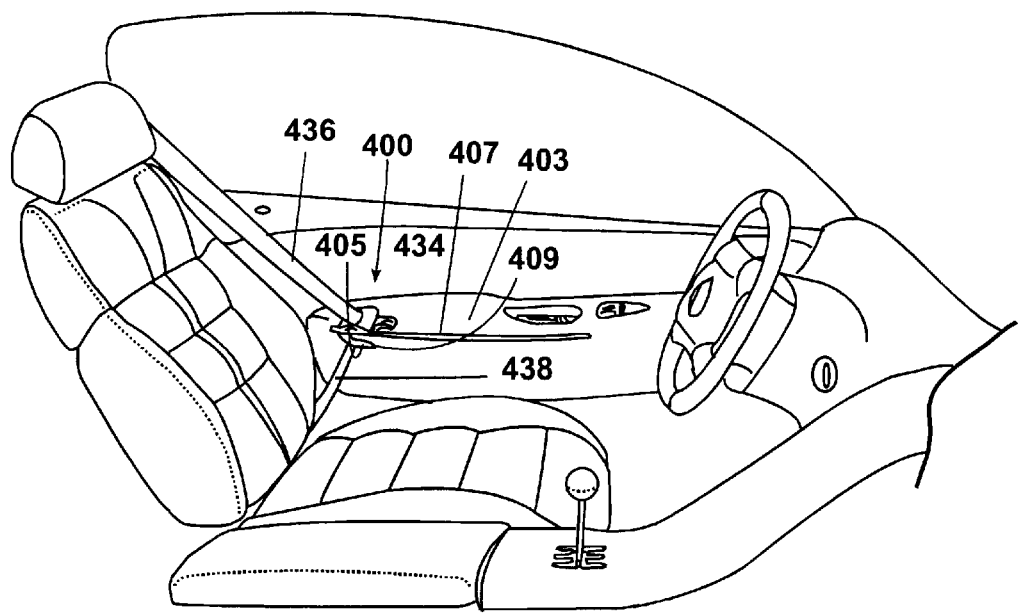
FIGS. 12 and 13 are an alternative embodiment of a non-rising sliding restraint belt presenter mounted within an inner door panel.
Figure 13:
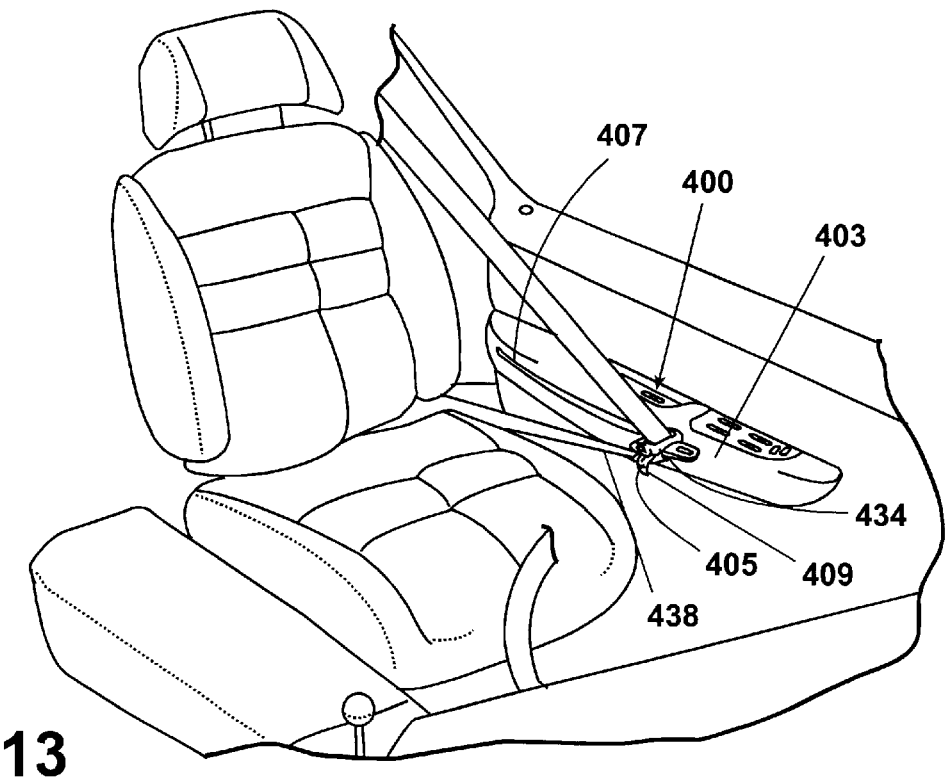

FIGS. 12 and 13 disclose an additional embodiment of a restraint belt presenter assembly 400. Similar to assembly 300, assembly 400 is a non-rising restraint belt presenter. However, assembly 400 is mounted within an inner door panel 403. Further, instead of a restraint belt positioning member, assembly 400 includes a laterally projecting arm 405 that has an end connected to track drive mechanism. Arm 405 extends through a slot 407 formed in door panel 403. During operation of assembly 400, the electric motor moves arm 405 forward from the starting position (FIG. 12) to the presenting position (FIG. 13), such that arm 405 catches lap belt portion 438 and buckle assembly 434 rests on top of arm 405. Preferably, arm 405 includes an inwardly curving distal end 409 to insure that buckle assembly 434 is retained through the presentation cycle. In another alternative embodiment, arm 405 may include a distal end 409 that folds completely around the restraint belt.

Figure 14:
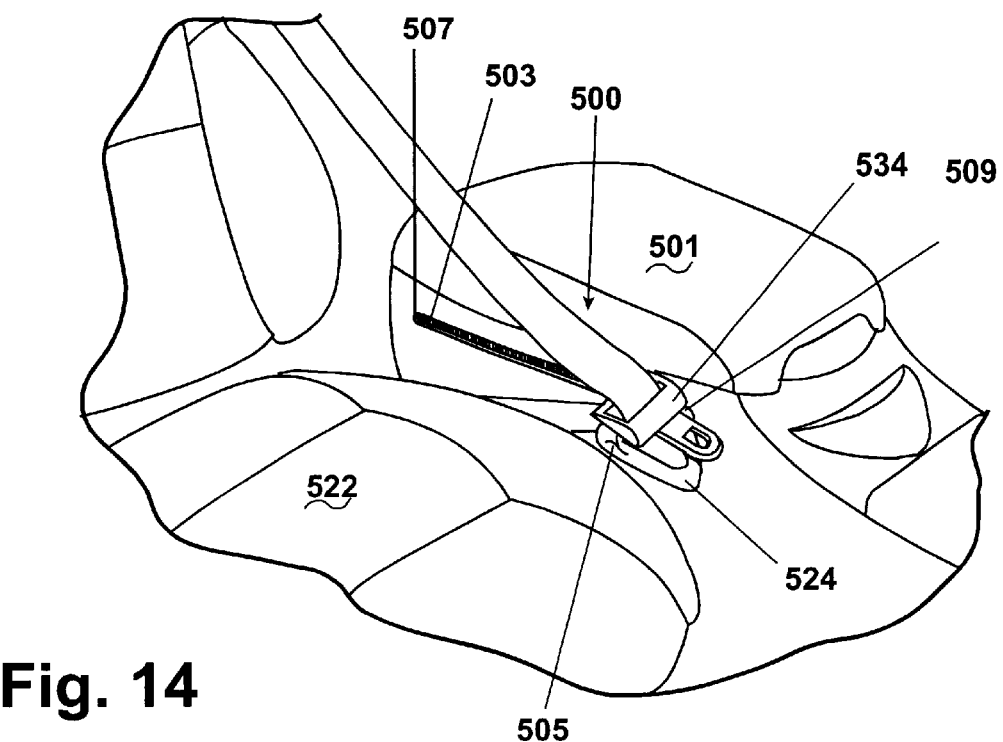
FIG. 14 is an alternative embodiment of a center console mounted sliding restraint belt presenter.

FIG. 14 shows another alternative embodiment of a sliding-type restraint belt presenting assembly 500. Assembly 500 is movably mounted within a center console 501 that is mounted to the floor of a vehicle. In accordance with assembly 500, a slot 503 is provided from which restraint belt positioning member 524 laterally extends, with buckle assembly 534 being positioned on a top portion 505 of positioning member 524. Further, the mating buckle receptacle is mounted to an outboard side of vehicle seat 522. Thus, the restraint belt is presented adjacent to a vehicle driver's right arm.

Assembly 500 may be either a pivoting restraint belt presenting assembly as in assemblies 20 and 200 or a non-pivoting restraint belt presenting assembly as in assemblies 300 and 400. Accordingly, for a non-pivoting restraint belt presenting assembly (as shown in FIG. 14) slot 503 is generally horizontal, such that a first end 507 of slot 503 is generally the same height as a second end 509 of slot 503 to deliver restraint belt positioning member 524 to the presenting position. For a pivoting restraint belt presenting assembly (not shown), slot 503 would be angled upwardly such that first end 507 of slot 503 would be at a first predetermined height and a second end 509 of slot 503 would be at a second predetermined height, wherein the second predetermined height is higher than the first predetermined height.

Figure 15:
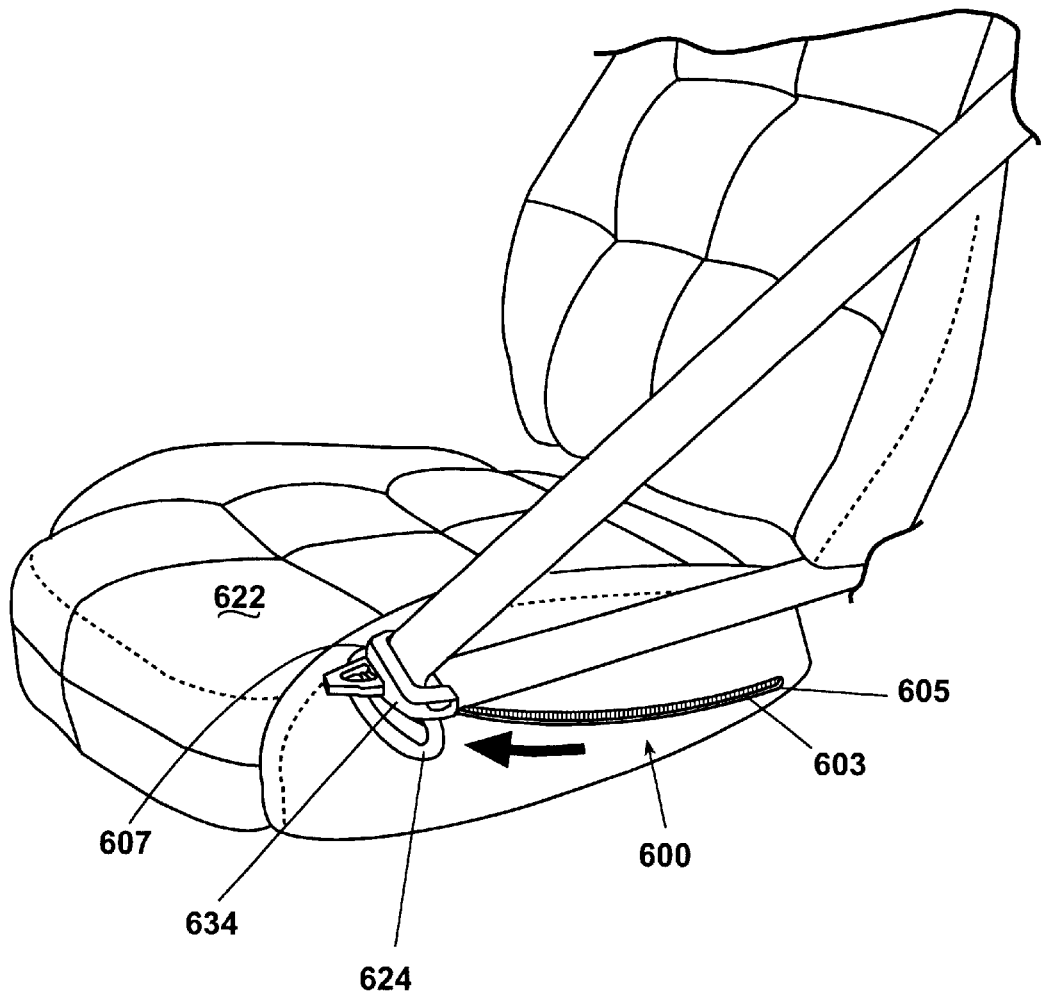
FIG. 15 is an alternative embodiment of a sliding restraint belt presenter mounted within the vehicle seat.

FIG. 15 is a slider-type restraint belt presenter assembly 600 that is fitted within a vehicle seat 622. A slot 603 is provided from which a restraint belt positioning member 624 extends laterally to support and properly position buckle assembly 634. Assembly 600 may be either a pivoting slider assembly as in assemblies 20 and 200 or a non-pivoting slider assembly as in assemblies 300 and 400. In a pivoting slider assembly 600 (as shown in FIG. 15), slot 603 is upwardly angled from a first end 605 having a first predetermined height to a second end 607 having a second predetermined height, wherein the second predetermined height is higher than the first predetermined height. Thus, when assembly 600 is actuated into the presenting position, restraint positioning member 624 is raised upwardly. Alternatively, assembly may be non-pivoting (not shown) such that first end 605 of slot 603 is at generally the same height as second end 607 of slot 603 such that restraint positioning member 624 is moved forward only when actuated into the presenting position.

Figure 16:
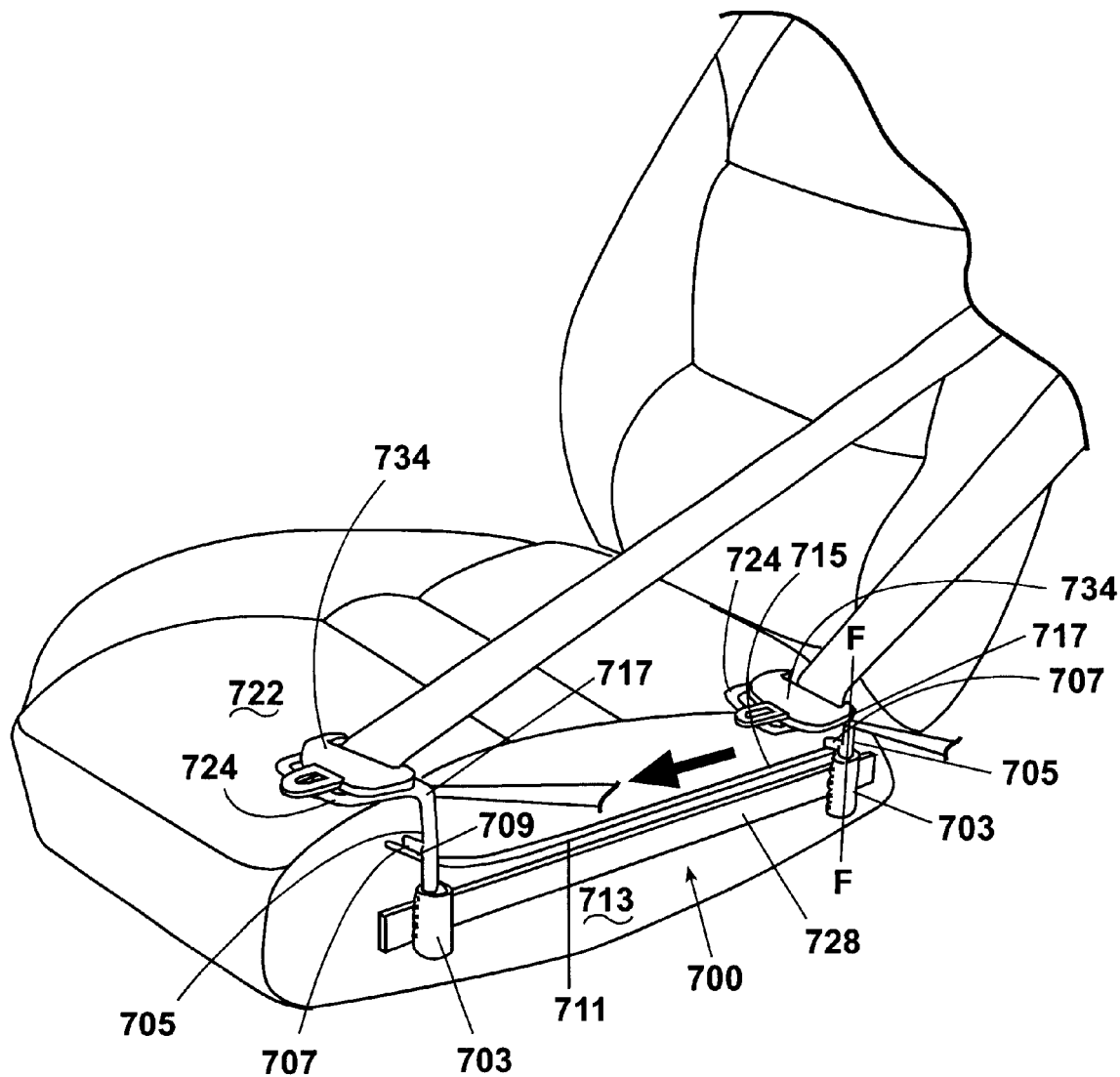
FIG. 16 is an alternative embodiment of a sliding, lifting restraint belt presenter.

FIG. 16 is another embodiment of a restraint belt presenter assembly 700 that includes a motor actuated roller 703, an extension member 705 with an inwardly extending lateral guide protrusion 707, a track member 728 and an angled stop member 709 formed on a guide track 711. In accordance with the invention, track member 728 is fixedly secured to a side portion 713 of vehicle seat 722. Guide track 711 is fixedly secured to side portion 713 and positioned above track member 728 at a first predetermined height. Roller 703 is rotatably connected to extension member 705 such that roller 703 rotates about axis F—F. Roller 703 further is frictionally engaged with track member 724. Alternatively, roller 703 could have a grooved center section (not shown) such that top and bottom portions of roller 703 grip the upper and lower edges of track member 724.

A portion of extension member 705 is slidably received within roller 703 such that extension member 705 may move up and down during the presentation cycle. Guide protrusion 707 is fixedly connected to extension member 705 and positioned so as to extend inwardly towards vehicle seat 722. Further, guide protrusion 707 is positioned at predetermined height so at to engage a top surface 715 of guide track 711 when in the starting position at the rear of vehicle seat 722. A top portion 717 of extension member 705 carries restraint belt positioning member 724 upon which buckle assembly 734 rests. When the electric motor (not shown) is actuated, assembly 700 is moved from the starting position by roller 703 moving along track member 724. Guide protrusion 707, which is initially positioned at a first distal end 719 of guide track 711, moves with roller 703 along guide track 711 toward angled stop member 709. Angled stop member 709 is angled upwardly such that guide protrusion 707 elevates extension member 724 upward to the presenting position to be easily accessible to a vehicle occupant. Angled stop member 709 can be curved or have a straight angle.

Figure 17:
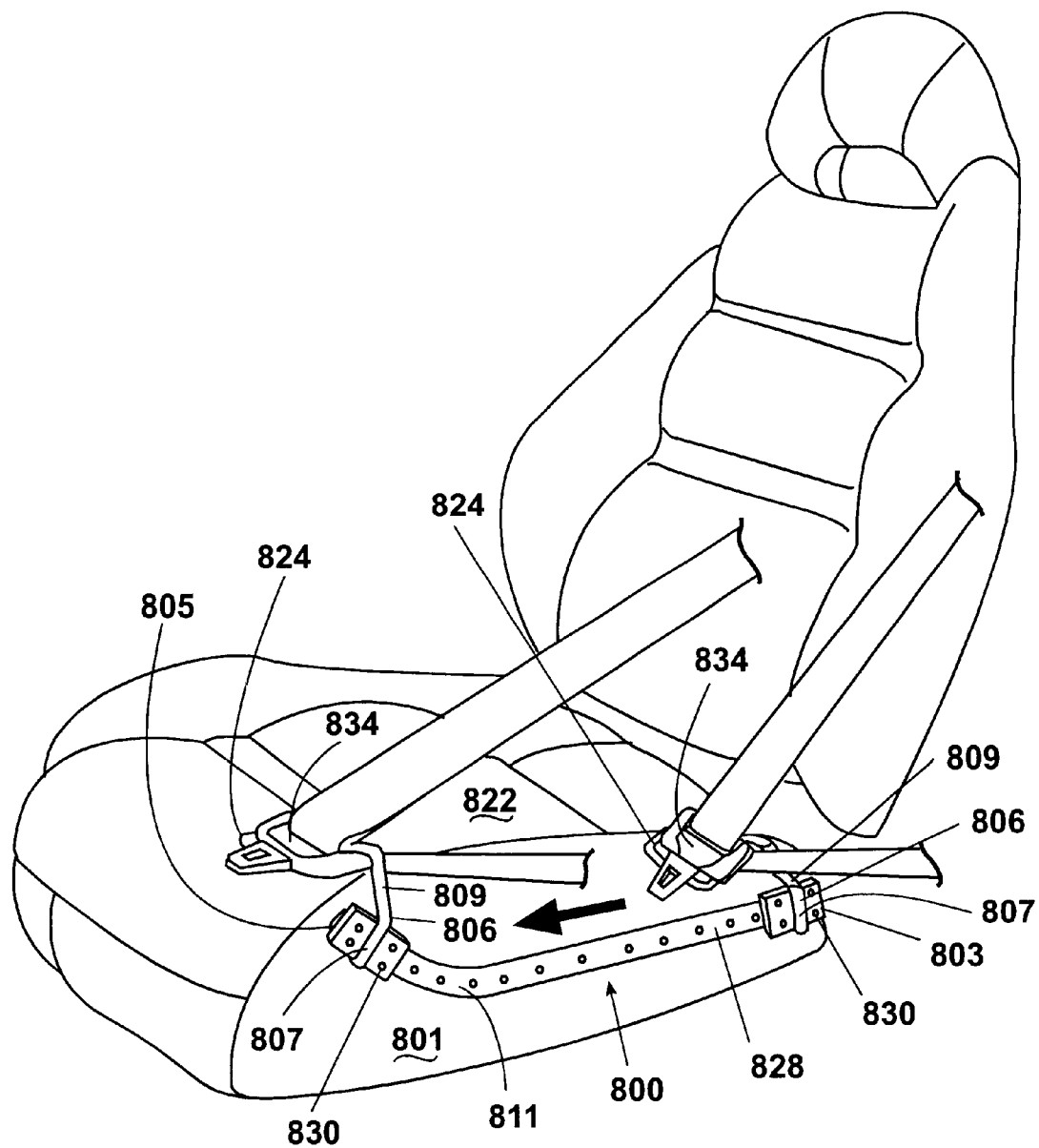
FIG. 17 is an alternative embodiment of a sliding restraint belt presenter that includes an upwardly curved track.

FIG. 17 is another alternative embodiment of a restraint belt presenter assembly 800 that includes a track member 828 and a motor actuated slidable member 830. In accordance with the invention, track member 828 is fixedly secured to a side surface 801 of vehicle seat 822 and has a first distal end 803 positioned at the rearward portion of vehicle seat 822 and a second distal end 805 that is positioned near the forward portion of vehicle seat 822. First distal end 803 has a first predetermined height and second distal end 805 has a second predetermined height that is higher than first predetermined height such that track member 828 curves upwardly towards second distal end 805.

Slidable member 830 is movably engaged with track member 828 and includes an extension member 806 fixedly connected thereto and extending upwardly therefrom. Extension member 806 has a first leg 807 and a second leg 809. First leg 807 is connected to slidable member 830. Second leg 809 is connected to first leg 807 and is angled. A restraint belt positioning member 824 is connected to and carried by second leg 809 of extension member 824.

As assembly 800 moves from the starting position to the presentation position, slidable member 830 moves along track member 828. When slidable member 830 reaches curve 811, restraint belt positioning member 824 is raised upwardly at an angle such that second leg 809 is perpendicular to vehicle seat when assembly 800 is in the presenting position. Accordingly, buckle assembly 834 is positioned so as to be resting generally at a horizontal angle on restraint belt positioning member 824, allowing for easy accessibility of the restraint belt to a vehicle occupant.

Figure 19:
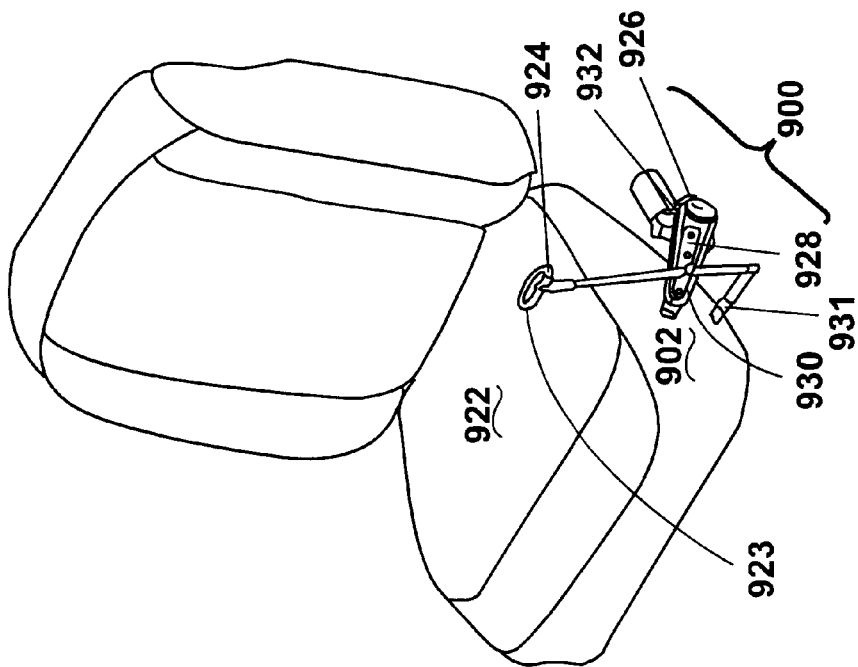
FIGS. 18–19 are perspective views of alternative embodiments of a pivoting stick-type restraint belt presenter mounted to a vehicle seat.
Figure 20:
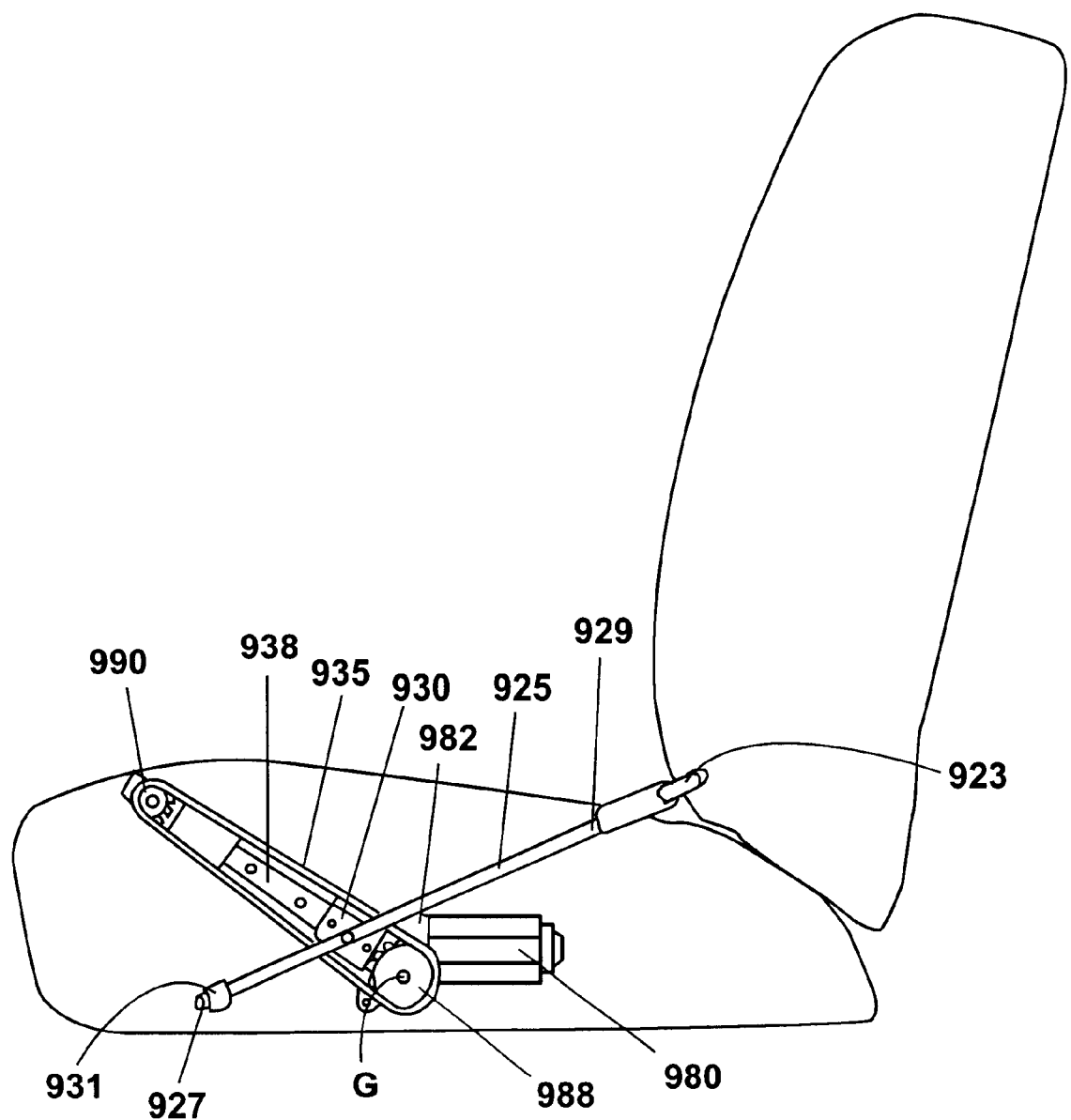
FIGS. 20–21 are elevational views of the pivoting stick-type restraint belt presenter.
Figure 21:
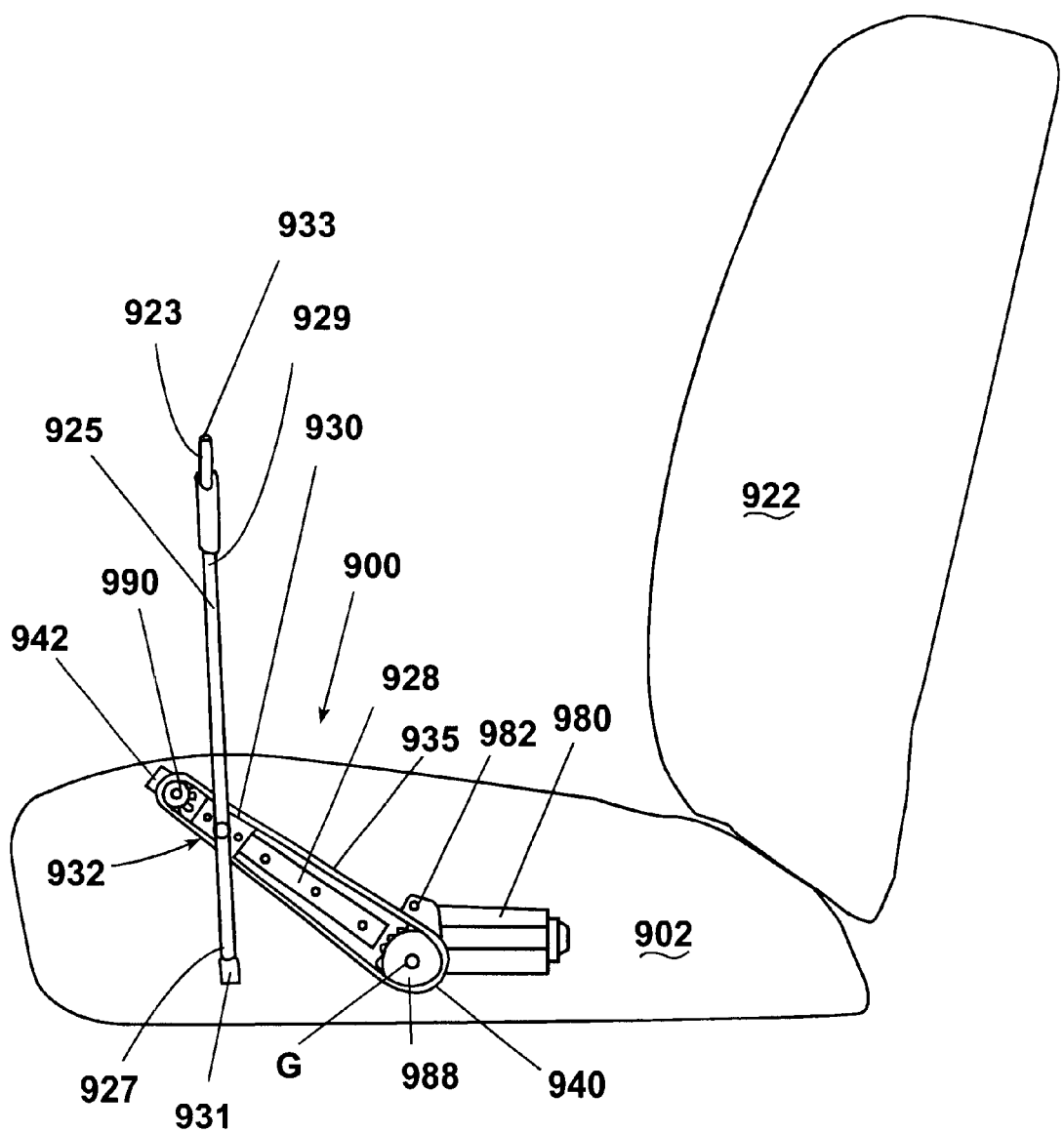

FIGS. 18–21 are directed to a stick-type restraint belt presenter assembly 900 mounted to a side surface 902 of a vehicle seat 922. An optional housing (not shown) may be provided to serve as a cover for assembly 900. Restraint belt presenter assembly 900 includes a restraint belt positioning member 924 that is pivotally mounted to a track drive mechanism 926. In accordance with the invention, track drive mechanism 926 selectively moves restraint belt engaging member 924 through a restraint belt presentation cycle from a starting position (as best seen in FIG. 20) to a presentation position (as best seen in FIG. 21). Track drive mechanism 926 includes a track member 928, a slidable member 930 for supporting restraint belt positioning member 924, a drive chain sub-assembly 932, and a gear mechanism 934 that moves assembly 900 between the starting position and presentation position.

Track member 928 is a generally rectangular component having first and second distal ends 940 and 942 and is fixedly mounted to vehicle seat 922. Track member 928 serves as the support for the components of restraint belt assembly 900.

A motor 980 for actuating assembly 900 is secured to a motor carrying plate 982. Motor carrying plate 982 is fixedly connected to vehicle seat 922. A sprocket 988 is mounted to motor mounting plate 982 and positioned at a first distal end 940 of assembly 900. Sprocket 988 is operatively connected to motor 980 such that power is transmitted from motor 980 to the sprocket 988 to rotate sprocket 988 about point G. The sprocket cooperates with an idler pulley 990 to be described below in further detail.

Figure 18:
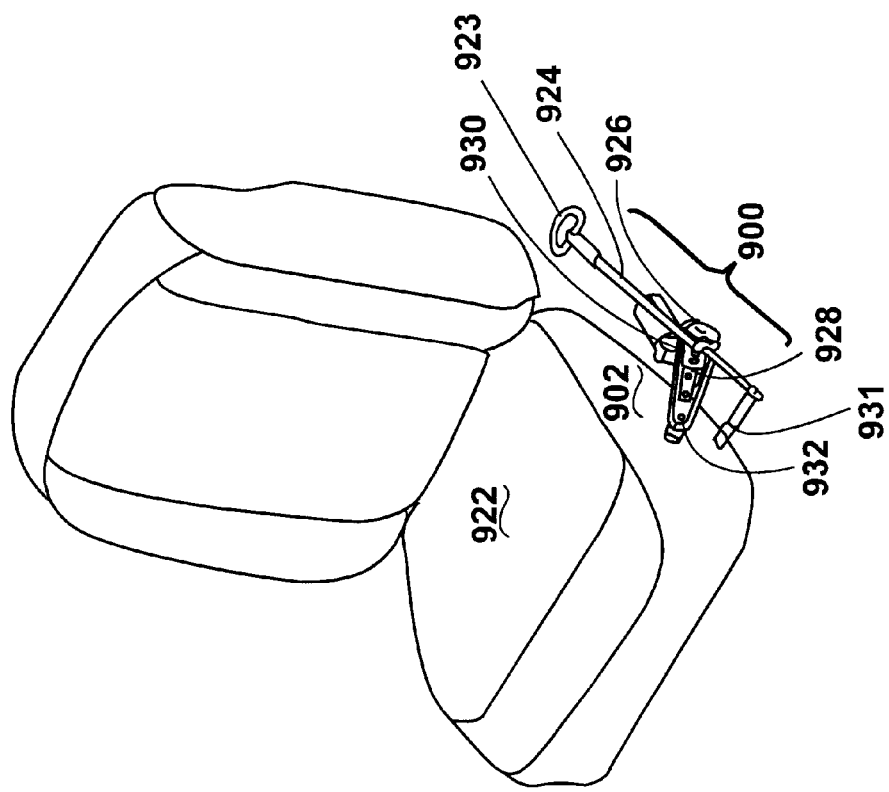

Slidable member 930 is slidably mounted on track member 928 with a portion of a drive belt 935 connected thereto. Restraint belt positioning member 924 is pivotally connected to slidable member 930. Restraint belt positioning member 924 includes a shaft member 925 having first and second ends 927 and 929, respectively. Connected to first end 925 is a laterally extending anchor pin 931 (as best seen in FIGS. 18 and 19). Anchor pin 931 is fixedly connected to vehicle seat 922 by a ball joint (not shown). Anchor pin 931 preferably further includes a through bore allowing first end 940 of shaft member 925 to slide relative to anchor pin 931 to accommodate changes in the distance between anchor pin 925 and slidable member 930, as shaft member 925 is raised and lowered.

Connected to second end 929 is a presentation ring 923. Presentation ring 923 has a center portion that is open, to be explained in further detail below. In one preferred embodiment, presentation ring 923 is attached to second end 929 of shaft member 925 via a pin that has a through bore. The pin allows selective rotation of positioning member 924 so that it may properly guide the restraint belt and reduce the likelihood of the restraint belt becoming twisted or tangled as it passes through the central opening section of positioning member 924. Alternatively, restraint belt positioning member 924 may be fixedly secured to second end 929 such that the outer periphery 933 of restraint belt positioning member 924 is generally parallel with shaft 924.

Drive chain sub-assembly 932 includes drive belt 935 that is driven by sprocket 988. Drive belt 935 engages idler pulley 990 that is positioned at and is rotatably mounted to second end 942 of track member 928. Second end 942 is positioned at a second predetermined height that is higher than a first predetermined height of first end 989.

The operation of restraint belt presenter assembly 900 is as follows. Slidable member 930 is initially positioned adjacent to sprocket 988 at first end 989 of track member 928. A belt buckle assembly (not shown) is positioned on presentation ring 923 such that the buckle extends away from the front of vehicle seat 922. A lap belt portion is positioned so as to extend through the central section of presentation ring 923. Both the shoulder portion and lap belt portions have distal ends connected to one or more conventional take-up reels (not shown). When restraint belt presenter assembly 900 is at the starting position presentation ring 923 is positioned at a predetermined height that does not alter the path of the restraint belt and is low enough to avoid bodily contact in the event of a side impact collision.

Preferably, a central processing unit connected to a plurality of sensors operates to control the sequence of the restraint belt presenter assembly. An electrical door switch or sensor in the vehicle door cooperates with a "seat occupied" switch or sensor in vehicle seat 922 to trigger the presentation cycle of restraint belt presenter 900. When the door switch indicates that the vehicle door is closed and the "seat occupied" switch indicates that vehicle seat 922 is occupied, motor 980 is activated, transmitting power to drive chain sub-assembly 932 via sprocket 988 and idler pulley 990. As drive belt 935 begins to move, slidable member 930 begins traveling from first distal end 940, upwardly along track member 928 towards second distal end 942 of track member 928. As slidable member 930 travels up track member 928, anchor pin 931 is permitted to pivot within the ball joint, causing shaft 925 to pivot forward in a counterclockwise direction, thereby raising presentation ring 923 to the presentation position. When slidable member 930 reaches second distal end 942, restraint belt positioning member 924 is in the presenting position presentation ring 923 being at a predetermined height that is clearly visible and easily accessible to the vehicle occupant. Next, vehicle occupant simply lifts off buckle assembly from presentation member 923 and secures the buckle to a buckle receptacle (not shown) located adjacent to vehicle seat 922 on a side opposite of restraint belt presenting assembly 900.

Preferably, an electrical limit switch or positional sensor is provided to shut off motor 980 when restraint belt presenter 900 reaches the presenting position. Further, as the buckle assembly is removed from restraint belt positioning member 924, the electrical sensor causes motor 980 to return slidable member 930 to the starting position, conveniently out of the vehicle occupant's way. Once reaching the starting position, motor 980 is shut off by an electrical limit switch or positional sensor. When the vehicle occupant disengages the buckle from the buckle receptacle, at least one pretensioned take-up reel automatically returns the buckle assembly to restraint belt positioning member 924.

Figure 22:
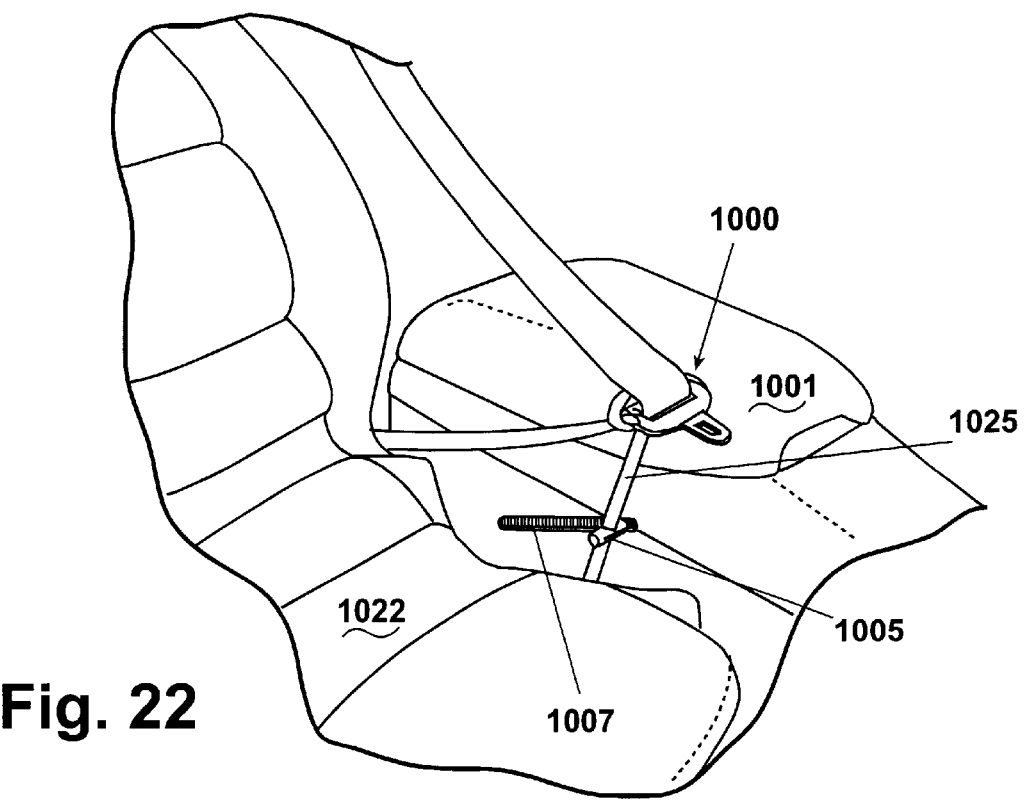
FIG. 22 is an alternative embodiment of the pivoting stick-type restraint belt presenter mounted to a center console.

FIG. 22 is directed to an alternative embodiment of a stick-type restraint belt presenter assembly 1000. Assembly 1000 is identical to assembly 900 except that assembly 1000 is mounted to a center console 1001 of the vehicle, inboard of vehicle seat 1022. In accordance with assembly 1000, shaft 1025 includes a transverse pivot member 1005 which is engaged with the slidable member in the interior of center console 1001 (not shown). Transverse pivot member 1005 extends through an upwardly angled slot 1007 that is provided in center console 1001.

Figure 23:
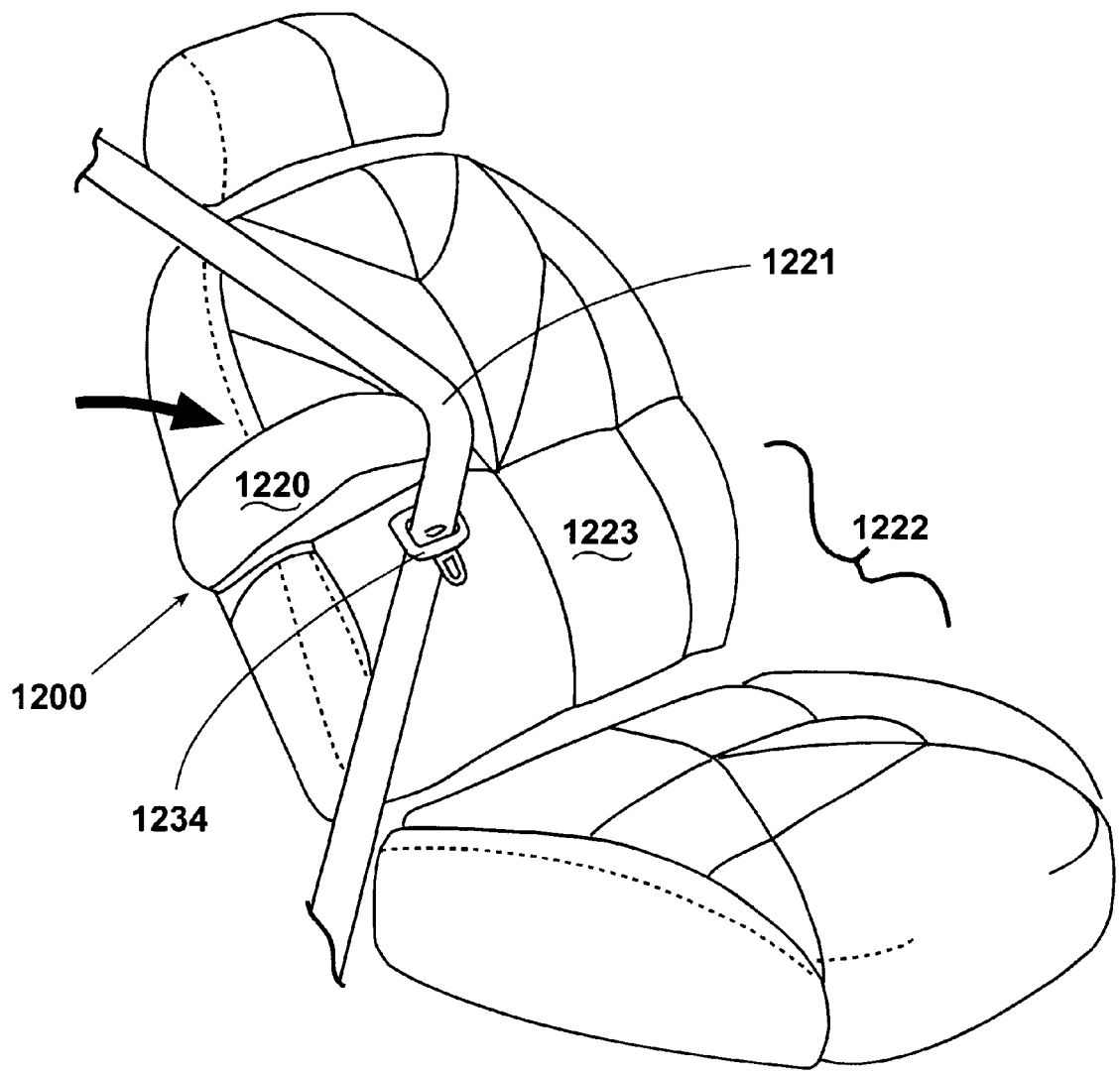
FIG. 23 is a perspective view of an alternative embodiment of a pivoting shoulder restraint belt presenter.

FIG. 23 is another embodiment of a restraint belt presenter assembly 1200 that utilized a motor driven shoulder 1220 of vehicle seat 1222 to present the restraint belt 1221 to a vehicle seat occupant. In accordance with the invention, shoulder 1220 is pivotally attached to vehicle seat back 1223. Shoulder 1220 is positioned in planar alignment with restraint belt 1221 such that upon actuation, shoulder 1220 pivots downwardly to contact a predetermined position on restraint belt 1221 such that buckle assembly 1234 rests just underneath shoulder 1220 within easy reach of the vehicle seat occupant. Shoulder 1220 may be a hard plastic shell, padded cushion or other suitable configuration. While shoulder 1220 is shown mounted on in outboard side of vehicle seat 1222, it is understood that shoulder 1220 may alternatively be mounted on the inboard side of vehicle seat 1222.

The restraint belt presenter of the present invention can be fabricated using any suitable materials, including but not limited to, steel, aluminum, and plastic.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A restraint belt presenter assembly for presenting a restraint belt to a vehicle occupant, comprising:
   a slidable member positioned adjacent to and alongside a vehicle seat, said slidable member adapted to move between a starting position and a presenting position;
   a restraint belt positioning member connected to said slidable member adapted to carry a restraint belt; and
   a drive mechanism having a track member and a drive chain assembly supported by said track member, connected to said slidable member for selectively moving said slidable member between said starting position and said presenting position such that said restraint belt positioning member brings the restraint belt forward from a storage position, and
   wherein said track member pivots about a first axis positioned at a first distal end of said track member such that a second distal end of said track member moves upwardly relative to said first distal end when said slidable member moves from said starting position to said presenting position.

2. The restraint belt presenter assembly of claim 1, wherein said track member is connected to the vehicle seat.

3. The restraint belt presenter assembly of claim 1, wherein said drive mechanism cooperates with a gear mechanism.

4. The restraint belt presenter assembly of claim 1, wherein said track member is connected to a mounting bracket, said mounting bracket being pivotally mounted to one of a vehicle seat or a center console.

5. The restraint belt presenter assembly of claim 1, wherein said track member is pivotally connected to a mounting bracket, said mounting bracket being fixedly connected to a vehicle floor.

6. The restraint belt presenter assembly of claim 1, further including a cam member and a cam follower that engages an outer surface of said cam member, wherein said cam member is operatively connected to said track member, said cam member movable between said starting position and said presenting position to pivot said track member.

7. The restraint belt presenter assembly of claim 6, wherein said drive mechanism further includes a motor driven rotatable drive belt mounted to at least one motor gear and a plurality of idler pulleys, wherein at least one of said idler pulleys is operatively connected to said cam member such that said drive belt moves said cam member between said starting position and presentation position, said drive belt further connected to said slidable member to move said slidable member between said starting and presentation positions.

8. The restraint belt presenter assembly of claim 6, wherein said cam member includes first and second stop members that cooperate with said stop members to restrict said movement of said slidable member.

9. The restraint belt presenter assembly of claim 1, wherein said slidable member further includes a movable base section and an extension member, said base section being operatively connected to said drive mechanism to move said slidable member and said extension member being connected to said base section and carrying said restraint belt positioning member.

10. The restraint belt presenter assembly of claim 9, wherein said extension member is pivotally connected to said base section.

11. The restraint belt presenter assembly of claim 1, wherein said restraint belt positioning member is a ring with an open center section such that a portion of a restraint belt may be threaded through said center section and a buckle assembly may rest on a first surface of said restraint positioning member as said slidable member moves from said starting position to said presenting position.

12. The restraint belt presenter assembly of claim 11, wherein said ring further includes a narrow slit formed therein for selective removal of said portion of a restraint belt.

13. The restraint belt presenter assembly of claim 1, wherein said restraint belt positioning member is a laterally projecting arm that holds a portion of a restraint belt such that a buckle assembly rests on a first surface of said arm as said slidable member moves from said starting position to said presenting position.

* * * * *